Nov. 20, 1956
L. F. THIRY
2,771,312
RUBBER BUSHING
Filed Aug. 16, 1952
3 Sheets-Sheet 1
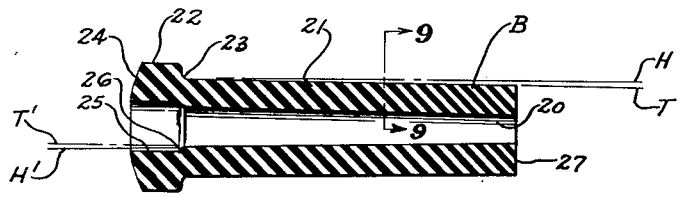
Fig. 1
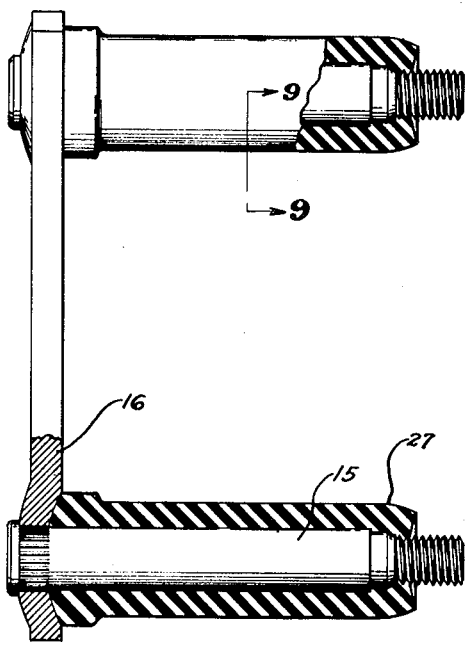
Fig. 9
Fig. 2
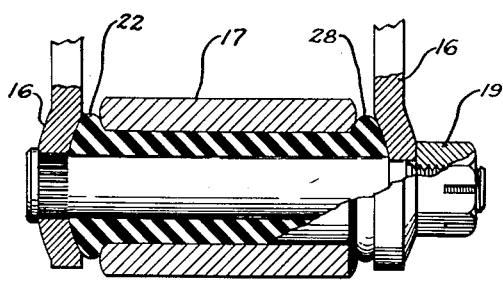
Fig. 3
INVENTOR.
LEON F. THIRY
BY
Fay & Fay
ATTORNEYS Nov. 20, 1956 L. F. THIRY 2,771,312
RUBBER BUSHING
Filed Aug. 16, 1952 3 Sheets-Sheet 2

INVENTOR.
LEON F. THIRY
BY
Fay & Fay
ATTORNEYS

Nov. 20, 1956   L. F. THIRY   2,771,312
RUBBER BUSHING
Filed Aug. 16, 1952   3 Sheets-Sheet 3

INVENTOR.
LEON F. THIRY
BY
Fay & Fay
ATTORNEYS

United States Patent Office 2,771,312
Patented Nov. 20, 1956

2,771,312

RUBBER BUSHING

Leon F. Thiry, Chagrin Falls, Ohio

Application August 16, 1952, Serial No. 304,685

4 Claims. (Cl. 287—85)

The present invention relates to improvements in rubber bushings forming part of a pivotal connection in which inner and outer concentric bearing members are connected by an intermediate annular member or rubberlike bushing.

An object of the present invention is the provision of an improved annular elastic bushing adapted to be disposed upon a central sleeve or pintle and within a coaxial embracing sleeve, together with means for applying compression at the outer end of the bushing. Another object of this invention is to provide a freedom of design in the shape of the elastic bushing which will materially reduce molding and mold unloading costs.

A further object of the invention is the provision of an annular elastic bushing which will provide sufficient grip upon an inner sleeve or pintle to substantially reduce the likelihood of twisting or creeping of the bushing upon the inner member.

Another object of the invention is to provide a bushing of the above type, the assembly of which into a spring eye or embracing sleeve is facilitated by having only one preformed flange, the other end being formed into a flange upon the application of axial compression forces.

Still another object is the provision of an integral shackle component adapted for assembly with an identical unit in which the annular elastic bushing is pre-assembled on the pintle element of an L-shaped integral hanger and pintle unit.

Other objects and advantages will become apparent hereinafter when the following specification is read in conjunction with the accompanying drawing.

In said annexed drawings:

Fig. 1 is a central sectional side elevation of one form of the improved rubber bushing element shown in its free state;

Fig. 2 is a similar section with a pair of bushings when dilated upon a pintle in a shackle assembly;

Fig. 3 is a central section of the shackle assembly upon the application of end compression;

Fig. 9 is taken on the line 9—9 of Figs. 1 and 2 showing a diametral section of the bushing in its free state and dilated form;

Figure 4:
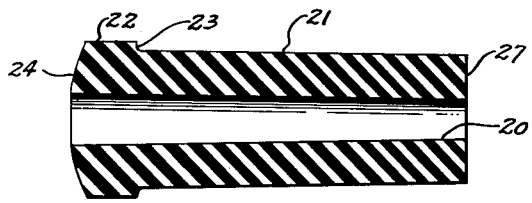
Fig. 4 is a modification of the bushing shown in Fig. 1.

Heretofore bushings of this type have been made in accordance with various well-known designs such as those illustrated in U. S. Patent 1,945,369 and U. S. Patent 2,467,548. These end compression type designs have heretofore employed a free rubber bushing adapted to be inserted between two concentric surfaces with the bushing having a slight relative clearance to each surface. After the bushing is positioned between these surfaces, end compression is applied which distorts the rubber and compresses it inwardly and outwardly against the rigid confining surfaces to form a pressure friction type of adhesion.

Experience has brought out certain limitations in these end compression type bushings, particularly in that it has been found to be very difficult to obtain any great degree of adhesive pressure between the rubber and metal surfaces and such pressure as is available in this type is obtained on a relatively limited amount of elastic material stretched outwardly at the ends of the bushing with insufficient pressure in the middle portion to insure a firm grip. Because the amount of energy which can be stored in the bushing by distortion of the rubber only at the ends this type is limited in its effectiveness. It has been found that a slight permanent set or a loss in volume occasioned by abrasion will bring about an impairment of the functioning in this type of bushing.

Applicant has discovered that by radially dilating a rubber bushing of a lesser internal diameter than the external diameter of the pintle with which it is to be engaged sufficient energy can be prestored in the bushing to provide such an effective grip upon a central pintle that surprisingly improved results are obtained in the performance of the bushing in comparison with experience on the previously available types.

Applicant has also discovered that through the use of a dilated bushing he can in most instances reduce the number of pieces of rubber by half, in that only one bushing is now needed whereas before two have been essential. He has further discovered that with the dilated bushing firmly gripping the pintle he need have only one preformed flange except for certain applications and that the other can be formed in assembly upon the application of axial compression.

Applicant further has found that molding and mold unloading problems and costs of bushings of this type can be substantially reduced in that it is no longer necessary to have a uniform cylindrical bore in the bushing since, upon dilation, the bore of the bushing will automatically assume the conformation of the pintle inserted therein. It has thus been possible to use such variations in internal diameter as are helpful in the facilitation of molding problems and in other matters as will be hereinafter brought out.

Referring now to the attached drawings, one form of the improved rubber bushing B is illustrated in Fig. 1 in the free state or undistorted form. Fig. 2 shows the bushing B mounted upon a central pintle 15 having a shackle plate 16 at one end thereof. In Fig. 3 the combination shown in Fig. 2 is depicted in assembly within a spring eye 17 between end plates 16, with a nut 19 applying end compression thereto.

In its free state as shown in Fig. 1 bushing B has a bore 20, an annular outer surface 21 and a preformed flange 22 at one end. A shoulder 23 interconnects the flange and the body or barrel 21 portion. The outer end face 24 of the bushing curves outwardly toward the center of the bushing as will be apparent in the various figures. At the flanged end of the bushing there is a counterbore area 25 terminating in a recessed shoulder 26.

It will also be noted that the bore of the bushings in Figs. 1 and 4 is largest at the end of the bushing adjacent the recessed shoulder 26 and that it tapers gradually to a smaller internal diameter at the opposite end. The outer annular surface 21 of the bushing is also tapered so that a constant annular wall section area is obtained in the body portion of the bushing. The taper of the outer surface of the bushing B is shown at the right side of Fig. 1 by the extended lines H and T and the taper of the bore of the barrel portion of the bushing is illustrated at the left by lines H¹ and T¹.

In assembling the bushing B upon the pintle 15 as shown in Fig. 2 it will be noted that the bore of the free state bushing B as illustrated in the upper half of Fig. 9 is of considerably less diameter than the external diameter of the pintle 15, and hence the rubber bushing must be radially opened or dilated as it is mounted upon the pintle by means of a suitable assembly operation effected in the presence of proper lubricant. Comparison of the dimensions and form of the rubber shown in Fig. 1 and in Fig. 9 in free and dilated state will indicate that the internal diameter of the bushing B is substantially increased and that the outer diameter is increased.

Comparison of the outer diameters of the bushing when dilated upon the pintle as shown in Fig. 2 and the free state diameter indicates that in the central barrel or tubular portion of the bushing a uniform outer cylindrical surface is obtained. It will also be noted that the dilation of the rubber bushing on the pintle brings the inner surface 20 of the bushing into conformity with the cylindrical external conformation of the pintle. Because of the conterbore 25 in the pre-flanged end of the bushing it will be apparent that the dilation of the rubber in the pre-flanged area is less in this form than that of the central body portion of the bushing. The dilation of the rubber bushing upon the pintle achieves, however, a direct positive radial pressure or grip which is imposed upon the pintle substantially throughout the contacted length of the pintle.

This radial grip of the rubber bushing upon the pintle is of such a degree that when axial pressure is applied to the unformed end of the bushing, as at 27, through the tightening of the nut 19 against the shackle plate 18 upon the pintle, a bulged or formed flange 28, generally similar to that form taken by the preformed flange 22, is obtained.

It should be explained that the internal diameter of the spring eye 17 is of a dimension sufficiently large so that the dilated bushing, as shown in Fig. 2, can be slipped therein without pressure. It will be understood that there is thus a slight clearance between the external diameter of the dilated bushing and the internal diameter of the spring eye 17.

When the dilated bushing mounted upon the pintle is slipped into the spring eye, and axial pressure is applied, this axial pressure builds up what may be termed a type of hydrostatic pressure in the body of the rubber. This pressure naturally acts outwardly and inwardly, increasing further the pressure already exerted against the pin by the grip of the rubber thereon and causing the rubber to swell outwardly and press against the bore of the spring eye. The bushing is thus brought into pressure friction adhesion upon the bore of the spring eye so that the slippage of the rubber between the concentric metal surfaces under torsional forces is restricted. Since the stresses due to torsion or other forces are greater on the smaller pintle diameter than on the bore diameter of the spring eye the unit pressure per square inch against the outer surface can be considerably less. This condition is achieved by the combination of the hydrostatic pressure obtained by the end compression, plus the dilation pressure on the pin.

In Fig. 4 there is shown a modified form of the free-state bushing in which the counterbore area at the flanged end of the bushing is eliminated. For certain applications it has been found that satisfactory performance can be obtained without the provision of a counterbore. It will be noted, however, that the inner and outer cylindrical surfaces of the bushing are tapered to facilitate unloading from the molds.

Figure 5:
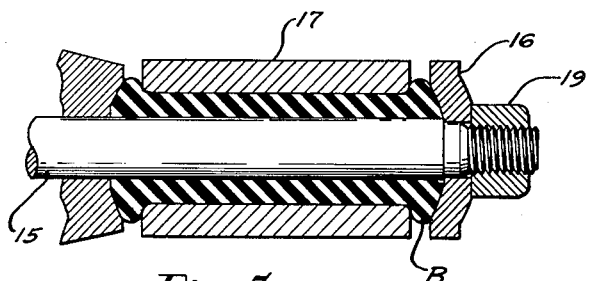
Fig. 5 is similar to Fig. 3 showing the bushing of Fig. 4 in assembly.

Fig. 5 shows a modified form of end plate assembly when other than shackle plates may be used, as, for instance, in the fixed eye of a leaf spring.

Figure 6:
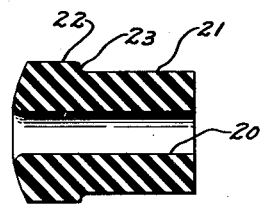
Figs. 6, 7 and 8 show modified short forms of the bushing used in pairs in the free state, dilated upon a sleeve and in assembled form.
Figure 7:
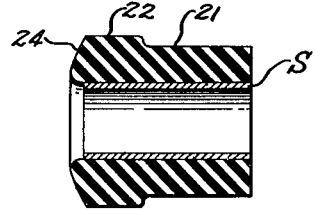
Figure 8:
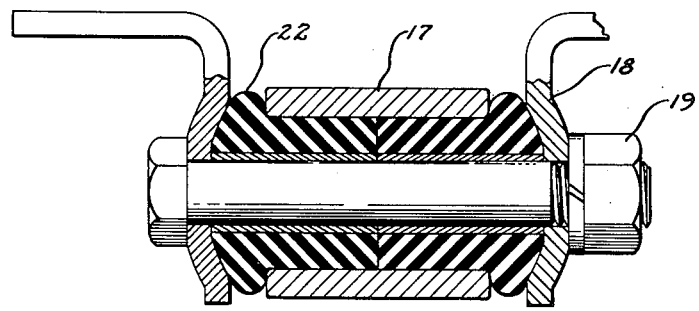

For certain applications, applicant has found that it is desirable to use a pair of shortened bushings instead of one long bushing, and illustrations of the use of these shortened bushings are shown in Figs. 6, 7 and 8. In instances such as this the rubber bushings are mounted upon a sleeve S with the flanged end of the bushing extending axially of the abutment end of the sleeve. The pair of bushings are then mounted with the body portions end to end upon a pintle and within the spring eye before axial compression is applied. It will be obvious that the same degree of precompression or gripping upon the sleeve member is obtained in this form of the invention as was achieved in the illustrations of Figs. 3 and 5, although in this instance the flanges are both preformed.

Figure 10:
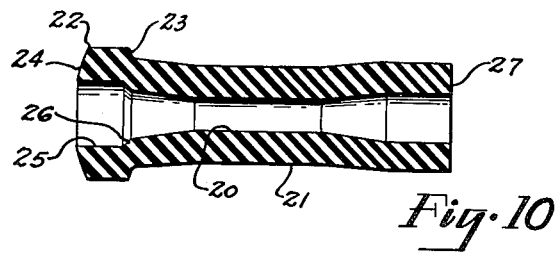
Figs. 10 and 11 are central sectional side elevations showing alternate forms which the rubber bushing may take.
Figure 11:
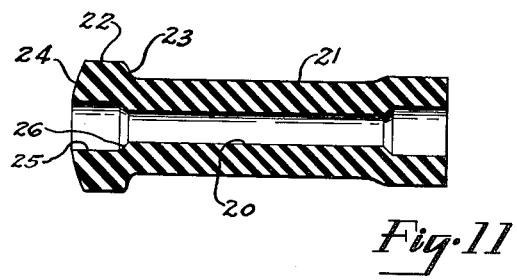

In Figs. 10 and 11 there are shown additional modifications which the free-state form of the bushing may take, indicating the degree of flexibility in bore design that is available for various use applications. In Fig. 10, for example, there is a central bore of smaller diameter, intermediate tapering bores adjacent thereto, a counterbore area at the pre-flanged end and a somewhat enlarged diameter portion at the non-flanged end of the bushing. The annular wall section area of the bushing, however, is substantially constant in the barrel portion so that when the bushing is dilated upon a pintle substantially a uniform cylindrical outer surface is obtained.

The same result is achieved with the bushing shown in Fig. 11, where there is provided a counterbore at both ends of the bushing with a uniform diameter portion intermediate the ends. When this bushing is radially opened upon a pintle a substantially uniform cylindrical body portion results. The degree of dilation is, however, less at the end of the bushing than in the central portion and this is desirable so that the end portions are more easily translated inwardly when end compression is applied and the unformed end takes the shape of the preformed flange in assembly.

Figure 12:
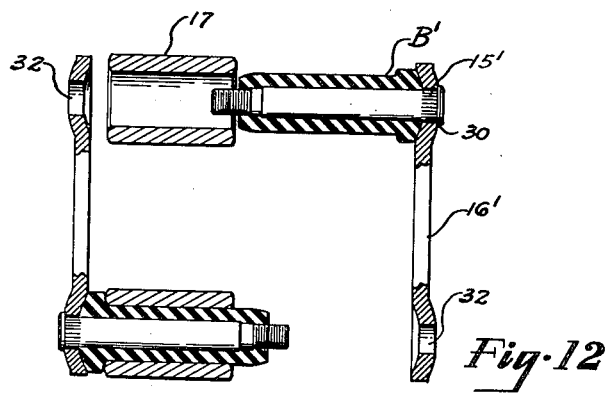
Fig. 12 is a central section of an alternate shackle assembly form embodying the invention.

In Fig. 12 a modified form of shackle unit is illustrated wherein the pintle 15¹ is press-fit into a shackle plate 16¹, forming an integral L-shaped shackle component adapted to be assembled with another identical component to form a complete shackle assembly with the spring eyes 17. Applicant has found the pintle 15¹ can be inserted into the bore 30 of the shackle plate and also inserted through the bushing B¹ in sequential operation. Thus pairs of shackle components can be produced ready for assembly with spring eyes at a minimum cost. The shackle plates in this form can be identical in that each plate will have an aperture 30 suitable for the larger end of the pintle and another aperture 32 adapted to receive the opposite smaller end of the pintle. In the shackle form shown in Fig. 2 the plate holding the heads of the pintle would have larger apertures than the plate at the opposite end, and thus two sets of plates are necessary in comparison to the simplification achieved in Fig. 12.

While curved flange end faces have been shown on the various forms the bushing may take, it will be clear that the engaging surfaces of both the compression plate 18 and the flange end 24 could take other contours and could be flat, since the dilation of the bushing upon the pintle achieves a circumferential tension throughout the length of the tubular portion. The axial compression exerted by the plates therefore, need only be sufficient to expand the bushing outwardly against the spring eye and the extra concentration of axial pressure obtainable through curved end plates may not be necessary for all applications.

It should be understood that when the word "cylinder" is used in the foregoing specification and in the claims it is intended that the meaning include cylinders whose bases may be elliptical, circular, polygonal, or other variations thereof, since for particular applications it may be desirable to use a cylindrical conformation other than right circular without departing from the spirit of the invention. It is likewise intended that the words "bore" and "diameter" include a corresponding dimension in other cylindrical forms referred to above.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A resilient mounting adapted to sustain radial, axial and oscillating loads comprising an outer rigid member having at opposite ends of a cylindrical bore annular abutment surfaces extending transversely to the axis of the bore, and a co-axial longitudinally extending rigid inner member having intermediate its ends a substantially continuous cylindrical surface of uniform diameter throughout, and compression members secured to said inner member and spaced axially from said abutment surfaces of said outer member and an annular rubberlike bushing fitted between and adhering to said members in pressure friction engagement and completely filling the space between the said inner and outer members, said bushing being characterized by having intermediate its ends a tubular portion of substantial length, said tubular portion of the bushing having in its free state a bore diameter substantially less than the diameter of the cylindrical surface of the inner rigid member and having in its dilated state, prior to the application of axial pressure to the mounting, substantially a right circular lateral surface with a diameter slightly less than the diameter of the bore of the outer rigid member, and said bushing also having at one end an integral flange extending outwardly of the tubular portion and being adapted to contact an abutment surface of the outer member, said bushing having, in its dilated state upon the inner member and prior to assembly, at the end of the tubular portion opposite the flange, an annular end portion having an outer diameter less than the inner diameter of the bore of the outer member with said annular end portion having sufficient volume so that when the said compression members associated with the inner member are adjusted inwardly on said member after the inner member has been disposed within the bore of the outer member, the tubular portion of the bushing receives an additional dilation bringing it into pressure friction engagement with the bore of the outer member and with a shoulder flange being formed at the end of the tubular portion opposite the first mentioned flange.

2. A resilient mounting as defined in claim 1, in which the annular rubberlike bushing has in its free state at least one end thereof a counterbore formed therein with its bottom substantially in the plane of the junction between the tubular portion of the bushing and a flange adjacent thereto.

3. A resilient mounting as defined in claim 1, in which the annular rubberlike bushing is further characterized by having in its free state in the tubular portion thereof a tapered internal bore with its larger diameter toward the end of the bushing having an intgeral flange thereon and with the annular wall section area of the tubular portion of the rubberlike bushing being substantially constant throughout the length thereof.

4. A mounting as defined in claim 1 in which the annular wall section area of the tubular portion of the rubberlike bushing is substantially constant throughout the length thereof whereby the outer annular surface of said portion of the bushing in its dilated state is substantially cylindrical throughout.

References Cited in the file of this patent

UNITED STATES PATENTS

| 1,833,002 | Smith | Nov. 24, 1931 |
| 2,049,024 | Robertson | July 28, 1936 |
| 2,240,709 | Mead | May 6, 1941 |
| 2,290,678 | Dodge | July 21, 1942 |
| 2,467,548 | Bradley | Apr. 19, 1949 |

FOREIGN PATENTS

| 527,463 | Great Britain | Oct. 9, 1940 |
| 632,541 | Great Britain | Oct. 28, 1949 |